United States Patent [19]

Gerlach et al.

[11] 4,359,359
[45] Nov. 16, 1982

[54] PRODUCTION OF POLYURETHANE EMBEDDING MATERIALS AND USE THEREOF

[75] Inventors: Klaus Gerlach, Obernau; Gerhard Wick, Obernburg, both of Fed. Rep. of Germany

[73] Assignee: Akzo N.V., Arnhem, Netherlands

[21] Appl. No.: 222,379

[22] Filed: Jan. 5, 1981

Related U.S. Application Data

[62] Division of Ser. No. 23,948, Mar. 26, 1979, Pat. No. 4,272,377.

[30] Foreign Application Priority Data

Mar. 25, 1978 [DE] Fed. Rep. of Germany ....... 2813197
Dec. 21, 1978 [DE] Fed. Rep. of Germany ....... 2855243
Feb. 26, 1979 [JP] Japan ................................... 2907501

[51] Int. Cl.$^3$ ................. C08G 18/32; C08G 18/30
[52] U.S. Cl. ............................... 156/294; 156/331.7; 210/321.3; 264/257; 264/258; 264/DIG. 75; 428/288; 528/56; 210/321.1
[58] Field of Search .............. 260/18 TN; 210/321 R, 210/321 A, 321 B; 428/288; 264/257, 258, DIG. 75; 156/331.7, 294; 528/56

[56] References Cited

U.S. PATENT DOCUMENTS

| | | | |
|---|---|---|---|
| 2,972,349 | 2/1961 | De Wall | 261/75 |
| 3,228,876 | 1/1966 | Mahon | 424/88 |
| 3,228,877 | 1/1966 | Mahon | 210/22 |
| 3,339,341 | 9/1967 | Maxwell et al. | 55/158 |
| 3,362,921 | 1/1968 | Ehrlich et al. | 260/18 TN |
| 3,422,008 | 1/1969 | McLain | 55/158 |
| 3,423,491 | 1/1969 | McLain et al. | 264/209.1 |
| 3,546,148 | 12/1970 | Diamond et al. | 260/18 TN |
| 3,676,382 | 7/1972 | Turbak et al. | 260/18 TN |
| 3,962,094 | 6/1976 | Davis et al. | 210/321.1 |
| 4,031,012 | 6/1977 | Gics | 55/158 |

FOREIGN PATENT DOCUMENTS

| | | |
|---|---|---|
| 2313842 | 10/1973 | Fed. Rep. of Germany. |
| 2340661 | 3/1974 | Fed. Rep. of Germany. |
| 2732182 | 1/1978 | Fed. Rep. of Germany. |
| 119052 | 4/1976 | German Democratic Rep. |
| 763405 | 12/1956 | United Kingdom. |
| 957585 | 10/1964 | United Kingdom. |

*Primary Examiner*—H. S. Cockeram
*Attorney, Agent, or Firm*—John H. Shurtleff

[57] ABSTRACT

Production of a polyurethane embedding material from an aromatic diisocyanate in stoichiometric excess with a polyol mixture consisting essentially of castor oil and trimethylolpropane to first form a prepolymer containing unreacted isocyanate groups and being sufficiently flowable to permit coating onto membrane surfaces in all types of coating methods, and subsequently hardening the prepolymer by addition of a cross-linking agent consisting essentially of castor oil alone or another mixture of castor oil with trimethylolpropane in an amount sufficient to cross-link the prepolymer through at least a majority of its unreacted isocyanate groups. The products obtained in the invention are the embedding materials or the resulting hardened or cured embedded products or more simply "bedded" final products which have excellent properties particularly adapted to the mounting of semipermeable membranes in dialysis equipment to give an improved and more useful construction.

20 Claims, No Drawings

PRODUCTION OF POLYURETHANE EMBEDDING MATERIALS AND USE THEREOF

This is a division of application Ser. No. 23,948 filed Mar. 26, 1979 now U.S. Pat. No. 4,272,377, issued June 9, 1981.

BACKGROUND OF THE INVENTION

The present invention relates to an embedding material based on a polyurethane produced from castor oil and an aromatic diisocyanate, modified by a glycol, and also to the process for producing the embedding material and its particular utility as a support for membranes.

A large number of embedding materials are known, especially synthetic polymerized compositions, and these embedding materials are used for various structural purposes, e.g. as a means of enclosing, fastening, strengthening, reinforcing, stabilizing or protecting any number of distinct articles, structural components or the like. The particular article or member is usually at least partly enclosed by the embedding material which must be relatively rigid and strong and also firmly adhered to and in intimate contact with the embedded member.

For the specific purpose of embedding membranes, for example, the thin-walled sheets, tubular foils or hollow fibers used in dialysis equipment, a variety of natural and synthetic substances have been recommended. In the German published application No. (DE-AS) 1,236,476, it is disclosed that such membranes, formed as fine hollow fibers and collected into several partial bundles, can be cemented into holders with the help of an embedding material based upon epoxy resins. Besides these epoxy resins, other materials recommended in the literature for use as an embedding material include, for example, elastomeric or resilient materials such as rubber, cork, foam rubber, etc., or also other resins such as phenol/aldehyde resins, melamine/aldehyde resins or heat-hardenable synthetic elastomers, acrylic resins and the like.

The embedding material most closely related to that used in the present invention has been disclosed in the German published application No. (DE-AS) 2,340,661 and consists of a flowable preadduct or prepolymer produced by reaction of an aromatic diisocyanate with castor oil which is then cross-linked with further castor oil after embedding with the prepolymer has occurred. Similar compositions have been used for the potting or encapsulation of electronic components, for example, as described in Chapter 10 of "Polyurethanes" by Bernard A. Dombrow, Reinhold Publ. Corp., N.Y. (1957) pp. 157–162. Among these potting materials, there is recommended at page 158 a nonfoamed solid polyurethane obtained by reacting castor oil/tolylene diisocyanate-/ethyl hexaediol-1,3 in a molar ratio of 1.66:3.50–4.00:1.00, using Sylon RD-602 (ditertiary butoxy diamine silane) as the curing agent. While found to be an excellent material for embedding electronic components, it was very difficult to obtain bubble-free products resistant to mechanical failure. A few other encapsulating materials using castor oil/diisocyanate mixtures are suggested in this Dombrow reference, the cross-linking or curing agent being a propylene oxide addition product of hexamethylene diamine with ethyl diethanol amine as a curing accelerator. Low-branched polyesters, e.g. as used to manufacture flexible foamed polyurethanes, have been suggested as a replacement for the castor oil in the embedding compositions.

In general, the polyurethane embedding materials obtained from castor oil/diisocyanate prepolymers require a long reaction time for hardening and the resulting cured product is too soft for many purposes. In order to obtain an embedding material of sufficient hardness, the polyurethane prepolymer has been catalytically hardened. The resulting embedding material then contains catalysts, however, making the insertion or emplacement of the object being embedded very damaging or even impossible. Also, such catalyst additions tend to cause a higher swelling of the known embedding materials and an undesirable discoloration.

SUMMARY OF THE INVENTION

It is an object of the present invention to provide polyurethane embedding materials as produced in a particular manner in order to avoid the above-noted disadvantages and to obtain a problem-free embedding even of delicate molded articles, for example, the thin-walled, semipermeable membranes used in artificial organs for blood dialysis. It is also an object of the invention to provide a cross-linkable polyurethane preadduct by a particular process whereby the embedding material is easy to handle and has favorable viscosity properties. Still a further object of the invention is to make a process available for producing the polyurethane embedding material which is relatively simple to carry out and which can be accomplished at a selective speed or rate of reaction, especially during cross-linking, to lead to a final product exhibiting a sufficient hardness and a swelling in aqueous systems which is non-existent or present only to a very slight and negligible extent. These and other objects and advantages of the invention will become more apparent from the following summary and detailed disclosure of the invention.

It has now been found, in accordance with the invention that a much more useful and effective embedding material can be obtained, particularly for embedding membranes, by providing a special polyurethane based on castor oil as obtained by the steps which comprise reacting an aromatic diisocyanate in stoichiometric excess with a mixture of castor oil and trimethylolpropane to form a flowable preadduct containing unreacted isocyanate groups and subsequently hardening said preadduct by intimately admixing therewith as a cross-linking agent (a) castor oil or (b) a mixture of castor oil and trimethylolpropane in an amount sufficient to cross-link the prepolymer through a majority of its unreacted isocyanate groups.

In the preparation of the preadduct or prepolymer to the polurethane, it has further been found most favorable to use a mixture with a molar ratio of trimethylolpropane to castor oil of about 0.5:1 to 1.5:1, especially about 0.9:1 to 1.35:1. Moreover, it is preferable to use an embedding material for purposes of the present invention wherein the amount of the aromatic diisocyanate used to form the preadduct is sufficient to provide an excess of isocyanate groups of about 233 to 4× per equivalent of hydroxy groups in the castor oil/trimethylolpropane mixture.

The cross-linking of the preadduct then takes place after addition of the castor oil or castor oil/trimethylolpropane cross-linking agent by providing about an equivalent amount of hydroxy groups with reference to the unreacted isocyanate groups of the preadduct. It is preferable in many instances, however, to carry out the cross-linking with a preadduct containing an excess of unreacted isocyanate groups with reference to the equivalents of hydroxy groups in the cross-linking agent, e.g. such that the molar ratio of isocyanate groups of the preadduct to hydroxy groups of the cross-linking agent is greater than 1 up to about 1.5 preferably in a range of about 1.01:1 to 1.3:1.

When using a mixture of trimethyololpropane and castor oil as the cross-linking agent, it has been found to be most helpful to use the trimethylolpropane in a molar ratio of less than 1, preferable in the molar ratio of about 0.05:1 to 0.10:1, i.e. in the range of 0.05 to 0.10.

Especially favorable results have been achieved by selecting 4,4'-dyphenylmethane-diisocyanate (MDI) as the aromatic diisocyanate reactant, especially the commercial product which contains about 18 to 28 mol%, preferably about 22–24 mol % of dimerized and trimerized diisocyanate. Also, a very suitable embedding material is obtained by using an aromatic diisocyanate such as MDI containing about 10–50 mol %, preferably about 20–30 mol % of 3-isocyanatomethyl-3,5,5-trimethylcyclohexyl isocyanate.

The embedding material can also have a content of 2–8% by weight, preferably about 3–5% by weight of a thixotropic agent based upon silicic acid, calculated as the pure $SiO_2$.

It was not foreseeable that by using a mixture of castor oil and trimethylolpropane in forming the preadduct, one could obtain after a cross-linking with castor oil or with a mixture of castor oil and trimethylolpropane a hard embedding material without requiring special catalysts which prevent desirable emplacements for many purposes, e.g. membrane emplacements in artificial organs. Moreover, the process of the present invention yields embedding materials which flow well in the preadduct stage but which will quickly set up with the emplacement, i.e. the member to be embedded, and which will then adhere very well to the emplacement and the holder, frame, mounting or the like in which it is to be used.

By comparison, if the preadduct is produced solely from the castor oil or the trimethylolpropane and this is cross-linked with castor oil or a mixture of castor oil and trimethylolpropane, then the outstanding properties of the catalyst-free embedding materials of the present invention are not obtained. Likewise, the results of the present invention are not achieved when the preadduct is produced with castor oil alone and the trimethylolpropane is used as the sole cross-linking agent.

The excellent balancing of the outstanding properties of the properties of the embedding material produced according to the invention, such as high hardness values, good processability, a good adhesion to the surfaces of the embedded members, high transparency and only slight swelling characteristics, can be achieved only if the preadduct is produced with a mixture of castor oil and trimethylolpropane. This favorable modifying effect of the trimethylolpropane as an initial reactant with the isocyanates and compounds such as castor oil has opened the way to surprising and unexpected possibilities for producing polyurethanes of particular value as the embedding materials of the present invention. Other trifunctional hydroxy compounds, for example glycerin, do not lead to comparable embedding materials.

The invention in the process and the resulting embedding products is further described in detail as follows.

DETAILED DESCRIPTION OF THE INVENTION

The process of the invention is essentially characterized by the reaction of an aromatic diisocyanate in a stoichiometric excess with a mixture of castor oil and trimethylolpropane to yield a preadduct or prepolymer containing unreacted isocyanate groups followed by the intimate admixture of castor oil or a mixture of castor oil and trimethylolpropane as a cross-linking agent in an amount sufficient for the added hydroxy groups to react with a majority of the unreacted isocyanate groups of the preadduct, and then by the hardening of the resulting mixture, e.g. after the emplacement of a particular article, member or component such as a membrane.

In the production of the preadduct according to the invention, the aromatic diisocynate can be used in a two- to four-fold excess with reference to the mixture of castor oil and trimethylolpropane, i.e. such that the excess number of isocyanate groups is about $2 \times$ to $4 \times$ the number of hydroxyl groups of the mixture, thereby providing a relatively large number of unreacted or available NCO-groups per equivalent OH-groups in the cross-linkable preadduct. The mixture of trimethylolpropane to castor oil in forming the preadduct is preferably a molar ratio of about 0.5 to 1.5:1, and more particularly about 0.9 to 1.35:1. Very good results are achieved with a molar ratio of from about 1.00 to 1.20:1, i.e. with about equimolar amounts up to a small excess of the trimethylolpropane.

The preadduct produced according to the invention is still fluid at 12° C. and remains clear and easily processed. These properties are especially important for the emplacement of delicate, flexible members such as thin-walled hollow tubular or fiber-like membranes. The preadduct must have good stability at relatively low temperatures for storage purposes but must also remain fluid or flowable to be introduced into a mold, a part cavity or the like to surround and embed a particular component or so-called emplacement. The addition of a thixotropic material which is relatively inert and non-reactive is often useful to permit the cross-linkable preadduct composition to be held in place or set up on the emplacement long enough for the hardening to take place so as to complete the embedding process.

It is suitable in the cross-linking of the preadduct to begin with this intermediate material in such an amount that excess NCO-groups are present with reference to the equivalents of OH-groups. It is especially favorable in the cross-linking to use a molar ratio of NCO-groups of the preadduct to HO-groups of the cross-linking agent of about 1.01 up to 1.3:1. However, embedding materials are also preferred wherein the preadduct is reacted, with reference to its free or unreacted NCO-groups, with an equivalent amount of the cross-linking agent, i.e. using appropriate amounts such that the number of OH-groups in the cross-linking agent corresponds as closely as possible to the number of NCO-groups in the preadduct.

One advantageous embodiment of the invention provides for a proportion of the castor oil in the cross-linking agent which is higher than the proportion of trimethylolpropane, i.e. by using a molar ratio of said trimethylolpropane to said castor oil of less than 1, preferably adopting a molar ratio of trimethylolpropane to castor oil of 0.05 to 0.1:1, especially about 0.06:1 to 0.08:1.

The preadduct can be produced using any of the usual aromatic diisocyanates, preferably selecting those which are readily available on a commercial basis under various trademarks, for example, as listed in Tables I and II on pages 347–348 of "Polyurethanes:Chemistry and Technology," by Saunders and Frisch, Interscience Publishers, John Wiley & Sons, N.Y. (1962). For purposes of the present invention, it is especially advantageous to use tolylene diisocyanate (TDI), usually as an isomeric mixture of the 2,4- and 2,6-isomers, and particularly diphenylmethane diisocyanate.

Moreover, it has been found that especially advantageous results are achieved by using a 4,4'-diphenylmethane diisocyanate which contains 18 to 28 mol % of the dimerized and trimerized diisocyanate. The proportion of dimerized and trimerized diisocyanate preferably amounts to about 22 to 24 mol %. In another special embodiment of this invention, it was further found that the cross-linking of the preadduct can be improved by the addition of a small catalytic amount of iron acetylacetonate, this catalyst preferably being admixed with the preadduct before the blending or mixing in of the castor oil or the castor oil/trimethylolpropane mixture as the essential cross-linking agent.

The preferred 4,4'-diphenylmethane diisocyanate is well known for use in preparing all types of polyurethanes and has the following structural formula:

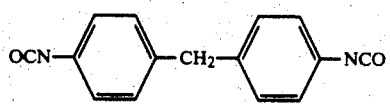
                        I which represent the monomeric form of this compound. This monomer has two isocyanate groups located in the 4-position of each of the two aromatic benzene rings.

Under the influence of catalysts such as amines or phosphines, two molecules of this diphenylmethane diisocyanate add to each other through reaction of one isocyanate group in each molecule, whereby a four-membered ring arises with the formula

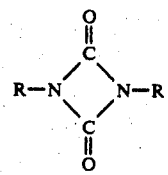
                        II wherein R represents

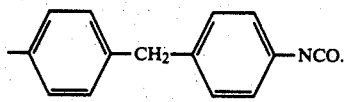

The dimerization is a reversible reaction. Dimerized diisocyanates may also be referred to as "uretdiones" or more particularly "uretidine diones". The particular dimer of the formula II may be formed slowly from the diisocyanate I, even without a catalyst.

Monomeric diisocyanates not only dimerize but also trimerize in the presence of catalysts, thereby forming a triisocyanate having an isocyanurate ring. These trimeric compounds can be represented by the formula

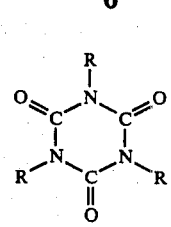
                        III wherein R is the organic residue of the monomeric diisocyanate such as the radical

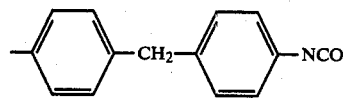

noted above.

The trimers of aromatic diisocyanates are quite thermally stable. A further review of the chemistry of the isocyanate trimers is given by Taub and McGinn, "Dyestuffs" 42, 263 (1958).

4,4'-diphenyl diisocyanate is commercially available. Pure 4,4'-diisocyanate, which contains practically no dimerized or trimerized diisocyanate and which is also substantially free of impurities, is a white to bright yellow product, but it does not offer the advantages of the present invention. Many of the liquid commercial products are brown-black, highly viscous mixtures which are completely unsuitable for the production of embedding materials or products, especially for the purpose of embedding membranes in dialysis equipment, e.g. for hemodialysis units. For this reason, it was surprising to find that the liquid products of the preferred compositions of the present invention may be used so advantageously in embedding materials.

4,4'-diphenylisocyanates of the required composition are obtainable commercially or can be prepared through isomerization of the monomeric diisocyanate by means of suitable catalysts, e.g. pyridine, dimethyl aniline, tri-n-butyl-phosphine and corresponding mixtures.

The quantitative determination of the proportion of dimerized and trimerized 4,4'-diphenyl diisocyanate can be carried out, for example, by infrared spectroscopic methods. Further information on analytic methods of this kind will be found in standard references such as "Einfuhrung in die Ultrarotspektroskopie" by Werner Brugel, Dr. Dietrich Steinkopff Verlag, Darmstadt (1964), 4th Edition, especially at pages 283 ff. The bands which are decisive for detecting the uretidine dione groups of the dimers and the isocyanurate groups of the trimers lie in the wave number range (cm$^{-1}$) of 1,700 to 1,800. In this range, the first band at a wave number of about 1,775 corresponds to the uretidine dione group and the second band at a wave number of about 1,720 corresponds to the isocyanurate group.

An especially important advantage is to be found in the fact that the preadduct having the terminal NCO-groups, as prepared by using the partly dimerized and trimerized diphenylmethane diisocyanate composition, exhibits a much better stability in storage and an excellent stability at lower temperatures. Thus, this preadduct is preserved for long periods of time at deeper temperatures, for example, at −18° C., without the occurrence of any precipitation. The preadduct also exhibits good viscosity properties and becomes easily cross-linked. It was especially surprising to find that even those membranes still having a perceptible moisture content permit a satisfactory embedding according to the working method of this invention with the use of an acetylacetonate as the catalyst. In general, it is usually necessary to dry the membrane before it is embedded in the polyurethane material to be hardened, so that no reaction can occur as between the preadduct and the water present as a residual moisture content whereby carbon dioxide is set free, something which can lead to irregularities and faults or so-called defective points due to bubble formation in the embedding material as a final product. This kind of problem is essentially avoided by the present invention. Also, the measures adopted herein are suitable for working in an automatic continuous or semi-continuous manner in providing embedded products.

In the production of the embedding substance or material, one generally proceeds by bringing the diisocyanate in excess together with a mixture of castor oil and trimethylolpropane in suitable proportions into a liquid phase for their reaction and then reacting the diisocyanate in this liquid phase until the reaction with the OH-groups of the castor oil and trimethylolpropane mixture is completed, there still eing unreacted isocyanate groups in the resulting prepolymer or so-called preadduct.

The premixing of the castor oil and the trimethylol propane for the cross-linking steps should take place separately; preferably the trimethylolpropane is dissolved in the castor oil with mixing at temperatures between about 80° and 100° C.

The preadduct and the mixture used as a cross-linking agent are then mixed together with stirring either at room temperature or at higher temperatures, e.g. up to about 50° C., and the resulting mixture is thereupon deaerated by evacuation. This bubble-free and cross-linkable reactive mixture is then ready to be used as an embedding material. In order to carry out the embedding and subsequent hardening of the material, one proceeds in a conventional manner. Also, the adjustment of the cross-linking additions and the temperature to achieve desired curing times or so-called "pot times" presents no difficulties.

A further advantageous embodiment of the invention is the preferred process in which an aromatic diisocyanate is used which contains about 10 to 50 mol %, especially about 20 to 30 mol %, of 3-isocyanato-3,5,5-trimethyl-cyclohexylisocyanate. This compound, as introduced according to the invention, is a colorless to lightly yellow, low viscosity liquid of the structural formula

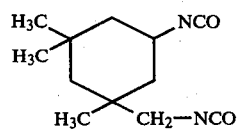

IV

This cycloaliphatic diisocyanate, also named isophorone diisocyanate, is a commercially available product; and it can be obtained, e.g. by reacting the corresponding diamino compound with hydrogen chloride or $CO_2$ and then further reacting with phosgene. A process for the production of this compound is disclosed for example in U.S. Pat. No. 3,401,190.

It is especially advantageous to use 4,4'-diphenylmethane-diisocyanate which contains about 18 to 28 mol% of the dimerized and trimerized diisocyanate and which further contains a portion of the additive 3-isocyanatomethyl-3,5,5-trimethyl-cyclohexylisocyanate.

It was particularly surprising to discover that embedding materials produced with the co-use of this diisocyanate IV exhibit an improved adherence to the emplaced membranes, e.g. cellulosic membranes. For example, with the embedding material obtained as the product in Example I below, it is possible to considerably increase the adhesive strength of about 6.5 cN/cm by the co-use of the cycloaliphatic diisocyanate IV; in this case the adhesive strength was increased up to a value of 11 cN/cm and even more.

In connection with the following Tables, the synthesis of several embedding materials according to the invention is explained in detail. The production of the materials suceeds in a manner analogous to Example 1.

The synthesis of the preadduct is set forth in Table 1 wherein the numerical values are presented in equivalents (val) based upon the reactive groups in each initial reactant. Thus, in referring to "1 val" of a substance, there is to be understood in each case an amount which in a definite reaction is combined with such as amount of hydrogen or is set free or is reacted with such an amount of hydrogen as that which is bound to 3 g of carbon in $^{12}CH_4$.

In Table II, the amounts in each case are set forth in parts by weight, wherein the cross-linking agent consists of a mixture of 7.31 val of castor oil and 0.5 val of trimethylolpropane. In the numbered tests, the preadduct in each case has been set forth with the same number taken from Table I.

The adhesive strength is determined in accordance with the following method which is based upon DIN (German Industrial Standard) 53.530. The Cuprophan membrane samples are the trademarked products of Enka AG, Wupperial, Federal Republic of Germany, these membranes being made of a regenerated cellulose as obtained by the cuprammonium process. Such artificial cuprammonium cellulose membranes are especially useful for dialysis equipment.

Test Method for Determining the Adhesive Strength

Two wide Cuprophan strips, each being 150 mm long and 15 mm wide, were each coated on one side over a length of 120 mm as uniformly as possible with the cross-linkable and hardenable polyurethane mixture to be tested. The two membranes are placed on each other such that the coated surfaces adhere together. Care should be taken that the end line where the surface coated with the mixture meets the non-coated residual surface (about 30 mm) is as straight as possible and exactly perpendicular to the length of the membrane strip, i.e. its longitudinal centerline. To harden or cure the mixture applied to the samples, they are supported freely for 10 days in 50% relative humidity at 23° C. In preparing for the tear tests, the individual samples are soaked for two hours in water at room temperature and then clamped in the test clamps of a conventional apparatus for measuring tensile strength (Zwick testing apparatus) in such a manner that the free, non-adhered ends of the sample are placed under tension. The feed or advancing speed of the apparatus is 100 mm/min. The adhered portion of the sample, during the tearing procedure, must be kept in a horizontal position by the two free ends which are tensioned vertically. The test results are reported in accordance with DIN 53,530.

TABLE I

Composition of the preadduct with the amounts of each component measured in val units:

| | Test No. | | |
|---|---|---|---|
| | 1 | 2 | 3 |
| MDI[a] (with oligomers) | 8.75 | 7.75 | 6.75 |
| IPPD[b] | 2.0 | 3.0 | 4.0 |
| Castor oil | 0.9 | 0.9 | 0.9 |
| Trimethylolpropane (TMP) | 1.3 | 1.3 | 1.3 |

[a] = 4,4'-diphenylmethane-diisocyanate containing about 22-24 mol % of its dimers and trimers, as obtained under the trademark Isonate 143 L.
[b] = 3-isocyanatomethyl-3,5,5-trimethyl-cyclohexylisocyanate.

TABLE II

Synthesis of the Cross-linked Embedding Material in parts by weight:

| | Test No. | | |
|---|---|---|---|
| | 1 | 2 | 3 |
| Preadduct | 42.05 | 46.63 | 41.20 |
| Cross-linker | 57.95 | 58.37 | 58.80 |
| Adhesive Strength[c] | 8.1 | 8.7 | 10.3 |

[c] = Average value in cN/cm

Especially favorable are those embedding materials which are modified by a content of about 2 to 8% by weight of a thixotropic agent on the basis of silicic acid, calculated as the weight percent of the pure $SiO_2$. The preferred amount of this thixotropic agent is about 3 to 5% by weight. For the production of such embedding materials, the thixotropic agent is admixed with the cross-linking agent, i.e. the castor oil or the mixture of castor oil and trimethylolpropane being used to harden the preadduct. This can be accomplished by a simple stirring in of the thixotropic agent with the cross-linker, preferably with an intensive and thorough mixing.

Thixotropy is a designation of the general phenomenon wherein a gel or other highly viscous substance becomes more thinly fluid or flowable under the influence of mechanical forces, e.g. with stirring, shaking, applying an ultrasonic effect, etc., and upon discontinuing this kind of mechanical stress, the substance returns to its highly viscous or even solid state as in a gel. The viscosity of a flowable substance containing a thixotropic agent thus decreases under the influence of the advancing tension or the shear speed. As a measure of the thixotropic behavior of a given material, there serves the so-called thixotropy index which is given as the quotient of the viscosities, for example, as measured in Pascal seconds at 3 and 30 or at 6 and 0 revolutions per minute.

The thixotropic agent to be added according to the invention is a product on the basis of silicic acid, i.e. a very pure silicon dioxide in the form of a "silicic acid gel". Attention is directed to the definitions proposed by E. A. Hauser in "Silicic Science," D. Van Nostrand Co., Inc., N.Y. (1955) at page 54. One available product of this type is Aerosil, a group of trademarked products available from the firm Degussa of Hanau, Federal Republic of Germany, the preferred product being Aerosil 200. This Aerosil is a collodial silicic acid produced by flame hydrolysis of silicon tetrachloride using an oxyhydrogen gas flame.

Embedding materials containing the thixotropic agent as recommended for this invention are especially suitable in the manufacture of hemodialyzers which require special techniques for the embedding of membranes, especially flat sheet membranes, in order to arrange the membranes perpendicularly in the embedding layer. Materials and structures of this kind are especially suitable for a continuous embedding with automatic machines.

The embedding materials of the invention are particularly suitable for membranes which are in the form of hollow fibers, tubular foils and flat sheets. Among various materials useful as membranes, especially semipermeable membranes for dialysis, it is preferable to choose a regenerated cellulose and especially that regenerated cellulose which is produced by the cuprammonium process and commonly referred to as "cuprammonium cellulose", a very pure artificial cellulose. Other useful membrane materials include polycarbonates, polyethercarbonates, polyurethanes, cellulose acetate and polyvinyl alcohol.

The embedding materials, membranes and other associated structures are preferably employed for purposes of the invention in providing selectively effective dialyzers, especially with hemodialyzers.

The embedding of these types of membranes as emplacements in artificial organs such as, e.g. artificial kidneys, artificial lungs and the like yields excellent results with the measures specified by the present invention. Especially in the case of artificial lungs where catalysts must be incorporated in the membrane wall, the presence of additional catalyst in the embedding material has had a detrimental effect. The present invention avoids this problem by using an embedding material which is free of catalyst or permits the selection of a non-damaging catalyst, i.e. one which is essentially inert to the conditions of dialysis and preferably one which will not discolor the embedding material after it is hardened or cured.

The centrifugal casting process is particularly suitable for the embedding of the membranes, e.g. as disclosed in the German Pat. No. 1,544,107. However, it is also possible to select other useful embedding procedures as are well known to the average skilled person in this art.

It was especially unexpected that the embedding materials of the present invention turned out to be essentially colorless, since this had been a very serious problem in the use of known embeddings of membranes, as in hemodialyzers, where the embeddings are so discolored as to prevent a clear and unobstructed view of changes in the blood or the dialysate. Such discoloration has been caused not only by the use of curing catalysts but also by an inappropriate selection of a suitable embedding material where the choices simply did not offer a recognizable solution to the problem.

In addition the embedding process and the products of the present invention have the distinct advantage that relatively moist membranes can be embedded with the use of approximately equivalent amounts of the cross-linking agent and the preadduct. The slight swellability of the hardened embedding material is also of special advantage.

During the hardening of the embedding material, practically no resin climbs up on the membranes so that for all separation processes. as in dialysis, a considerably higher exchange or transfer surface area is available than with conventional processes and equipment. Furthermore, no detrimental effect on the membranes themselves could be observed during hardening or in the final product.

The fact that the embedded material shows hardly any swelling in aqueous media is especially significant in dialyzers for the purification of blood. After soaking for ten days in water, the weight uptake of the embedded material is only on the order of 0.06%. Based upon such a weight increase, the embedded materials of the invention are thus capable of keeping well within a swelling value of less than 0.5% and preferably less than 0.1% by weight.

In carrying out the embedding process, it is possible to work with the embedding material at room temperature. Even in curing or hardening of the cross-linkable embedding resin, it is not necessary to resort to any special precautionary measures. The hardening proceeds rapidly and is substantially completed after only one hour even at room temperature. With moderately elevated temperatures, e.g. on the order of 50° C., the hardening is already sufficiently completed after 30 minutes to be able to remove the embedded article out of the centrifuge when working with the conventional centrifugal casting process.

The hardening or curing is thus readily controlled by the temperature with a relatively quick curing when heating with temperatures up to about 50° C; higher temperatures are also feasible but less desirable because of an increased risk of damage to the membrane or the polyurethane embeding material, so that the curing temperature is generally below 80° C. and preferably below about 60° C.

Essentially no shrinkage occurs in the hardening of the preadduct resin of prepolymer so that the membranes, e.g. hollow fibers, are not squeezed or crushed together, and the dimensional stability of the moded product is quite good. The adhesion of the cured material to the membranes is exceptionally good so that leakage points do not arise. Because the embedding material and the cured product can be produced without any catalyst, they are not toxic and can be advantageously used in those particular applications, such as hemodialysis, where it is extremely important to use only non-toxic materials. The embedding materials of the invention are also outstandingly useful in other similar applications, for example with membranes for other artificial organs such as artificial lungs and the like. The hardness of the final cured material reaches very satisfactory values, for example up to a Shore A-Hardness of about 100.

The invention is further explained by but not limited to the following specific examples.

EXAMPLE 1

71.75 parts by weight of 4,4'-diphenylmethane-diisocyanate are melted at 120° C. in a reaction flask under a nitrogen atmosphere and then caused to react with a mixture consisting of 24.32 parts by weight of castor oil and 3.93 parts by weight of trimethylolpropane for a period of two hours under constant stirring.

In the meantime, 99.12 parts by weight of castor oil and 0.88 parts by weight of trimethylolpropane are mixed with each other in another vessel under nitrogen at 100° C. to provide the cross-linking agent.

Then, 46.325 parts by weight of the preadduct and 53.675 parts by weight of the cross-linking agent are mixed together with constant stirring or agitation for a period of five minutes at room temperature, after which the mixture is deaerated by evacuation which requires about ten minutes. The resulting mixture has a viscosity at room temperature of about 4 to 5 Pascal seconds (Pa s).

Thereafter, the embedding mixture is used in accordance with the known centrifugal casting process for embedding membranes, for example a membrane composed of a bundle of hollow fibers made of regenerated cuprammonium cellulose (Cuprophan). The embedding of the hollow fiber bundle in a dialyzer housing takes place in a conventional manner, i.e. by introducing the embedding material into a centrifuge in which the housing part has been mounted. The clear, transparent, bubble-free mixture to be hardened is introduced through a filling device in the dialyzer housing at a centrifuge speed of about 500 rpm. During this filling and centrifuging, the centrifuge and its contents are maintained at a temperature of about 50° C. After a total of 30 minutes centrifuging, the centrifuge is turned off and the dialyzer housing is removed with the hollow fiber bundle firmly mounted in the substantially cured embedding material.

After the dialyzer housing and the installed fiber bundle have been cooled, the embedded article is cut on both sides to form a plane surface setting free the hollow space of the hollow fibers. Conventional finishing steps can be adopted to make certain that the bundle of hollow fibers is open on both ends and free of damage or foreign matter.

Suitable filling substances present from the production into hollow fibers, e.g. a liquid filler such as isopropyl myristate, can be removed in the centrifuge before the embedding with the centrifugal casting treatment through centrifuging, or else the initially formed bundle of hollow fibers can be freed of the filling liquid and then inserted directly into the housing or other holder in the centrifuge. During the embedding, it is not possible for the embedding material to climb up onto the fibers so that there is no danger of reducing the available transfer area of these fibers beyond the minimum requirements of the mounting or embedded area of the emplaced bundle.

EXAMPLE 2

For the emplacement of membranes in the form of flat sheets or foils, 42.61 parts by weight of the preadduct according to Example 1 are intensively mixed together with 57.39 parts by weight of the cross-linking agent of Example 1 at room temperature for about 5 to 7 minutes after which the mixture is deaerated by evacuation within about 3 to 5 minutes.

The embedding takes place by injecting the curable reaction mixture into a correspondingly prepared form which contains 10 flat sheet membranes in a close parallel arrangement. At room temperature, the curing reaction requires about two hours. After standing at room temperature for another 24 hours, the embedded product has a Shore A - Hardness of 65.

EXAMPLE 3

4,196 grams of a liquid 4,4'-diphenylmethane-diisocyanate with a content of 23.05 mol % of the dimerized and trimerized diisocyanate (the commercial product identified above as Isonate 143 L as obtainable from the firm Upjohn Polymer B.V. of s'Hertogenboschn, Holland) are filled into a 6-liter glass flask and heated at 80° C. while leading in nitrogen and stirring. In the meantime, in another glass flask, 159 grams of trimethylolpropane are dissolved in 845 grams of castor oil while stirring and leading in nitrogen.

Then, within a half hour, this solution as a modifying mixture in its still warm state is added dropwise to the diisocyanate whereby the temperature increases to about 100° C.

The mixture is caused to react at 100° C. with stirring up to the attainment of the NCO-value corresponding to the preadduct, i.e. in theory equal to 18.85% by weight of NCO. This reaction requires about 2 up to 2½ hours.

In another 6-liter glass flask, a cross-linking mixture is produced by dissolving 43.97 grams of trimethylolpropane in 4,956 grams of castor oil at 90° C. while stirring and leading in nitrogen.

Thereafter, 43 parts by weight of the preadduct and 57 parts by weight of the cross-linking mixture are placed together in a round flask, and during a period of 15 minutes at room temperature, alternately stirred under normal pressure and for the purpose of deaerating subjected to a vacuum of less than 1 millibar (absolute pressure).

The resulting mixture is then used for embedding a bundle of hollow fibers by the conventional centrifugal casting method.

EXAMPLE 4

Following the same procedure as in Example 3, a preadduct and a chain lengthening mixture are first produced. Then, departing from the working method of Example 3, there is used for the cross-linking 43 parts by weight of the preadduct as well as 57 parts by weight of the cross-linking mixture which in this case contains 0.175 percent by weight of iron acetylacetonate as a catalyst.

The preadduct and the cross-linking mixture are combined in a device used for the automatic embedding of hollow fiber bundles, as described in the Prospectus 600 H Series entitled "Processing Systems for Urethane Elastomers" by the firm Fluidyne Instrumentation of 1631 Pueblo Avenue, Oakland, Calif., U.S.A.

For this embedding, moist hollow fiber bundles were used. The total time required for hardening the embedding material amounted to 15 minutes.

EXAMPLE 5

Production of a preadduct with 2.5 val of isophorone-diisocyanate 8.25 val of 4,4′-diphenylmethane-diisocyanate, which contains its own dimers and trimers (Isonate 143 L), are introduced into a reactor together with 2.5 val of isophorone-diisocyanate and then heated to an internal temperature of 80° C. while stirring and leading in nitrogen to provide an inert atmosphere, the reaction continuing until a clear solution is present. In the meantime, in a second reactor, a solution of 0.9 val of castor oil and 1.3 val of trimethylolpropane is produced within about 1 hour at 90° C. The trimethylolpropane/castor oil solution after cooling to 70° C. is then added over a one hour period to the isocyanate solution preheated to 80° C. The temperature which increases as a result of the exothermic reaction may reach a maximum of 100° C. However, the reaction temperature should be regulated by cooling so as not to exceed 90° C. The reaction mixture is caused to react for a period of 2 hours, up until the mixture has reached an isocyanate content of 19.3 to 19.7 percent by weight.

EXAMPLE 6

Production of the chain lengthener 7.31 val of castor oil and 0.5 val of trimethylolpropane, under stirring and while leading in nitrogen as an inert atmosphere, were treated in a reactor at 90° C. within 1 hour through heating and convection into a homogeneous solution.

The following examples describe the working method for the embedding or emplacement of hollow fibers or foils in hemodialyzers.

EXAMPLE 7

213.52 grams of preadduct produced according to Example 5, kept at room temperature, are premixed at 25° C. with 324.84 grams of the chain lengthener produced according to Example 6, likewise kept at room temperature until used, and the mixture is evacuated so as to be free of air. This step requires 15 minutes. The mixture at this point has a viscosity of 3.8 Pascal seconds. A cuprammonium cellulose (Cuprophan) hollow fiber bundle is then embedded in a hemodialyzer according to the centrifuge casting procedure with 100 grams of the initially prepared preadduct mixture. The centrifuge is run at 500 rpm and at a temperature of 40° C. After 120 minutes, the dialyzer is removed from the centrifuge and cut to open the ends of the hollow fibers.

The hardened polyurethane could be cut without difficulties and gave a smooth, clean, cut surface without leaving a residue of cutting dust or stray pieces of hollow fibers. The adhesion to the Cuprophan hollow fibers is excellent.

EXAMPLE 8

Use of a thixotropic agent 6.69%-by wt. of Aerosil 200 is added to the chain lengthener according to Example 3 by intensive mixing, this amount corresponding to an Aerosil content in the total embedding material of 4.0%-by wt. For the production of the embedding material, 40.2 grams of the preadduct according to Example 1 are stirred with 59.8 grams of the Aerosil-containing chain lengthener and the resulting mixture evacuated to remove all air bubbles. The thixotropy indices are determined at a shear rate precipitation ratio of 1:8 (Rotovisko by Haake, RV 2, Measurement setting SVII, Measuring head 50) and the results collected in the following Table III.

TABLE III

Thixotropy Index:
The Aerosil is added as above and the ratio measured at two temperatures.

| Measuring Temp. | Chain lengthener | Preadduct/lengthener mixture |
|---|---|---|
| 25° C. | 6.26 | 3.06 |
| 50° C. | 5.45 | 3.00 |

The mixture is coated onto foils arranged at right angles. A flow does not take place. The hardened polyurethane is opaque.

The invention is hereby claimed as follows:

1. A process for the production of a polyurethane embedding material which comprises reacting an aromatic diisocyanate in stoichiometric excess with a mixture consisting essentially of castor oil and trimethylolpropane to form a flowable preadduct containing unreacted isocyanate groups and subsequently hardening said preadduct by intimately admixing therewith as a cross-linking agent (a) castor oil, or
(b) a mixture of castor oil and trimethylolpropane in an amount sufficient to cross-link the prepolymer through a majority of its unreacted isocyanate groups.

2. A process as claimed in claim 1 wherein said mixture used to form the preadduct has a molar ratio of trimethylolpropane to castor oil of about 0.5:1 to 1.5:1.

3. A process as claimed in claim 1 wherein said mixture used to form the preadduct has a molar ratio of trimethylolpropane to castor oil of about 0.9:1 to 1.35:1.

4. A process as claimed in claim 1 wherein the amount of aromatic diisocyanate used to form the preadduct is sufficient to provide an excess of isocyanate groups of about 2× to 4× with reference to the equivalents of hydroxy groups in said castor oil/trimethylolpropane mixture.

5. A process as claimed in claim 4 wherein said mixture used to form the preadduct has a molar ratio of trimethylolpropane to castor oil of about 0.9:1 to 1.35:1.

6. A process as claimed in claim 1 wherein the cross-linking is carried out with a preadduct having an excess of isocyanate groups with reference to the equivalents of hydroxy groups in the cross-linking agent.

7. A process as claimed in claim 6 wherein the molar ratio of isocyanate groups of the preadduct to hydroxy groups of the cross-linking agent is about 1.01:1 to 1.3:1.

8. A process as claimed in claim 1 wherein the cross-linking is carried out with an amount of the cross-linking agent providing an equivalent amount of hydroxy groups with reference to the unreacted isocyanate groups of the preadduct.

9. A process as claimed in claim 1 wherein the cross-linking agent is a mixture of trimethylolpropane and castor oil in a molar proportion of trimethylolpropane:castor oil of less than 1.

10. A process as claimed in claim 9 wherein said molar ratio of trimethylolpropane to the castor oil in the cross-linking agent is about 0.05 to 0.1.

11. A process as claimed in claim 1 wherein the aromatic diisocyanate is a 4,4'-diphenylmethane-diisocyanate which contains about 18 to 28 mol % of the dimerized and trimerized diisocyanate.

12. A process as claimed in claim 1 wherein the aromatic diisocyanate is a 4,4'-diphenylmethane-diisocyanate which contains about 22 to 24 mol % of the dimerized and trimerized diisocyanate.

13. A process as claimed in claim 1 wherein the cross-linking is carried out in the presence of a catalytic amount of iron acetylacetonate.

14. A process as claimed in claim 1 wherein the preadduct is obtained from an aromatic diisocyanate containing about 10 to 50 mol % of 3-isocyanatomethyl-3,5,5-trimethylcyclohexylisocyanate.

15. A process as claimed in claim 14 wherein the aromatic diisocyanate contains about 20 to 30 mol % of 3-isocyanatomethyl-3,5,5-trimethylcyclohexylisocyanate.

16. A process as claimed in claim 1 wherein the mixture of castor oil and trimethylolpropane used as the cross-linking agent contains about 2 to 8% by weight of a silicic acid thixotropic agent calculated as pure $SiO_2$.

17. The polyurethane embedding material obtained by the process defined in claim 1, 2, 3, 4, 5, 6, 7, 8, 9, 10, 11, 12, 13, 14, 15 or 16.

18. In a process of applying a polyurethane embedding material in supporting relationship to a porous membrane wherein a preadduct of the polyurethane embedding material containing a cross-linking agent is applied to said porous membrane and is then cross-linked and firmly adhered to said membrane, the improvement comprising employing as the polyurethane embedding material the product of the process of claim 1.

19. The process as claimed in claim 18 wherein said porous membrane is in the form of hollow fibers, tubular foils or flat sheets.

20. The process as claimed in claim 18 wherein said porous membrane is composed of a regenerated cellulosic material.

* * * * *